(12) United States Patent
Sonoda

(10) Patent No.: US 6,763,408 B1
(45) Date of Patent: Jul. 13, 2004

(54) INTERFACE SWITCHING DEVICE AND TERMINAL USING THE SAME

(75) Inventor: Yuko Sonoda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 586 days.

(21) Appl. No.: 09/639,548

(22) Filed: Aug. 16, 2000

(30) Foreign Application Priority Data

Aug. 27, 1999 (JP) ............................................ 11-241052

(51) Int. Cl.$^7$ ............................................ G06F 13/12
(52) U.S. Cl. ............................. 710/73; 710/12; 710/64; 710/131; 712/43
(58) Field of Search .............................. 710/1, 15, 18, 710/31, 36, 40, 62, 63, 72, 73, 100, 131, 12, 17, 64; 712/43, 225

(56) References Cited

U.S. PATENT DOCUMENTS

| | | | |
|---|---|---|---|
| 4,354,261 A | * | 10/1982 | Hagen et al. .................. 370/42 |
| 5,579,487 A | * | 11/1996 | Meyerson et al. .......... 710/100 |
| 5,761,448 A | | 6/1998 | Adamson et al. |
| 5,775,939 A | * | 7/1998 | Brown ........................ 439/502 |
| 5,870,465 A | * | 2/1999 | Hosbach et al. ............. 379/419 |
| 5,873,125 A | * | 2/1999 | Kawamoto ................... 711/202 |
| 6,016,523 A | * | 1/2000 | Zimmerman ................. 710/63 |
| 6,138,180 A | * | 10/2000 | Zegelin ........................ 710/11 |
| 6,324,605 B1 | * | 11/2001 | Rafferty et al. ............. 710/100 |

* cited by examiner

Primary Examiner—Jeffrey Gaffin
Assistant Examiner—Rijue Mai
(74) Attorney, Agent, or Firm—Brinks Hofer Gilson & Lione

(57) ABSTRACT

An interface switching device is connected to a keyboard unit and a computer. Two data lines, a power-supply line, and a ground line, which are provided at the interface switching device, are respectively connected to a data line, a clock line, a power-supply line, and a ground line, which are provided at the keyboard unit. An unused line is connected to an identification line. At the computer, the unused line, and the power-supply line or the ground line, are short-circuited. When the interface switching device is connected, a keyboard is notified of a voltage as identification information which is fixed at a power-supply voltage or zero volts.

5 Claims, 2 Drawing Sheets

INTERFACE SWITCHING DEVICE AND TERMINAL USING THE SAME

BACKGROUND OF THE INVENTION

1. Field of the Invention

The present invention relates to interface switching devices for adapting an apparatus provided with a PS/2interface for a USB interface, and in particular, to an interface switching device using a converting adapter to perform automatic switching.

2. Description of the Related Art

Keyboards and mice have been used as devices for inputting data to computers. In these keyboards and mice, an interface called "PS/2" is mainly used. However, recently, instead of the PS/2 interface, an interface called the "USB (Universal Serial Bus)" is in the process of coming into use as an interface not only for keyboards and mice but also for peripheral devices.

The PS/2 interface completely differs from the USB interface in connector shape and data format. Accordingly, for using the PS/2 interface, a PS/2 device must be connected to a PS/2 port provided in a computer, and for using the USB interface, a USB device must be connected to a USB port provided in a computer.

This construction has a problem in that, since a PS/2 port will not be provided in future computers (as hosts), a conventional keyboard (as a terminal) adapted for the PS/2 interface cannot be used and a new keyboard adapted for the USB interface must be bought.

Even in the case where a computer is provided with both PS/2 and USB type ports, if devices having USB output units, such as a keyboard and a mouse, which are as many as the number of (normally two) USB ports, are connected to the USB ports, more devices cannot be connected to the USB ports. Accordingly, add-on devices for increasing the number of USB ports have been made practicable, and are on sale. Inconveniently, a user must buy such a device.

In addition, an adapter for switching the PS/2 interface and the USB interface has already been made available. The mechanism of this adapter is complex since its adapter component performs data conversion. The stability of its operation cannot be secured because the PS/2 interface and the USB interface differ from each other in signal processing in that the PS/2 interface performs signal processing on transistor-transistor logic (a process using a 0-volt signal and a 5-volt signal) and the USB interface performs differential output signal processing. The complex mechanism makes it impossible to provide an adapter with a low price.

SUMMARY OF THE INVENTION

The present invention is made for solving the foregoing problems. Accordingly, it is an object of the present invention to provide an interface switching device which switches interface types, as required, and which secures the stability of its operation without being provided with any complex mechanism.

To this end, according to the present invention, the foregoing object is achieved through provision of an interface switching device including an output unit adapted for a first interface, which is provided on the side of a terminal, an input unit adapted for a second interface, which is provided on the side of a host, and an adapter for connecting the output unit on the terminal side and the input unit on the host side. When the output unit on the terminal side is connected to the adapter, the adapter supplies identification information to the output unit on the terminal side, and an output signal from the output unit on the terminal side is switched to a signal adapted for the second interface.

When the first interface is used to establish connection between the host and the terminal, the output unit on the terminal side may be connected to the input on the host side without using the adapter. When the second interface is used to establish connection between the host and the terminal, the adapter may be connected both to the output unit (toward the terminal) adapted for the first interface and to the input unit (toward the host) adapted for the second interface. This makes it possible to perform switching between the first interface and the second interface.

In this case, the terminal needs to be provided with a generating unit which can generate both a signal adapted for the first interface and a signal adapted for the second interface.

Preferably, the identification information is supplied to the output unit on the terminal side from a line among the output lines of the first interface which is not used in the second interface.

By way of example, at the output unit on the terminal side, by providing beforehand, as an identification line, a line to be connected to the unused line in the second interface, the unused line cannot be used at all when the adapter is not connected, and the identification signal can be supplied to the output unit via the identification line when the adapter is connected. Thereby, when receiving the identification signal, the terminal can switch an output signal adapted for the first interface to an output signal adapted for the second interface, and supplies the signal to the host.

As described above, the interface switching device can be formed by a simplified mechanism in which the identification information is simply supplied to the terminal via the identification line provided beforehand at the terminal. At the terminal, the signal adapted for the second interface is generated and directly output, which makes it possible to secure sufficient stability of operation.

Preferably, the unused line is connected to a power-supply line or a ground line.

When the unused line is connected to the power-supply line, the terminal is notified of identification information fixed at a predetermined voltage via an identification line. When the unused line is connected to the ground line, the terminal is notified of identification information including a voltage fixed at zero volts (ground potential) via the identification line. The terminal detects the identification information including either voltage, thereby detecting switching from the first interface to the second interface, and an-output signal adapted for the second interface is sent to the host in accordance with the switching.

Preferably, the first interface is a PS/2 interface, and the second interface is a USB interface.

The PS/2 interface consists of, for example, six output lines. Among the six lines, two lines are not used, and either of the two unused lines may be used as an identification line. When the adapter is connected, the identification line is connected to an unused line of the adapter, and the unused line and the power-supply line or the ground line are short-circuited, whereby identification information composed of a constant voltage is supplied to the terminal via the identification line.

According to the present invention, interfaces having different types of specifications, such as a PS/2 interface and a USB interface, can be switched in accordance with circumstances. In addition, an interface switching device can be provided with a low price since it has a simplified adapter mechanism, and sufficient stability of its operation can be secured since signal conversion is not directly performed by the adapter mechanism.

DESCRIPTION OF THE PREFERRED EMBODIMENTS

Figure 1:
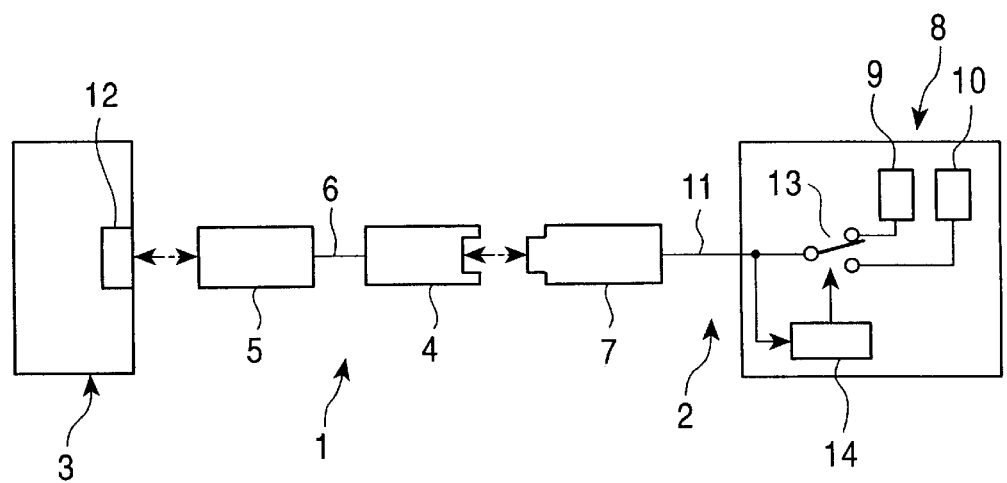
FIG. 1 is a block diagram showing an interface switching device according to an embodiment of the present invention, which is connected to a host and a terminal.
Figure 2:
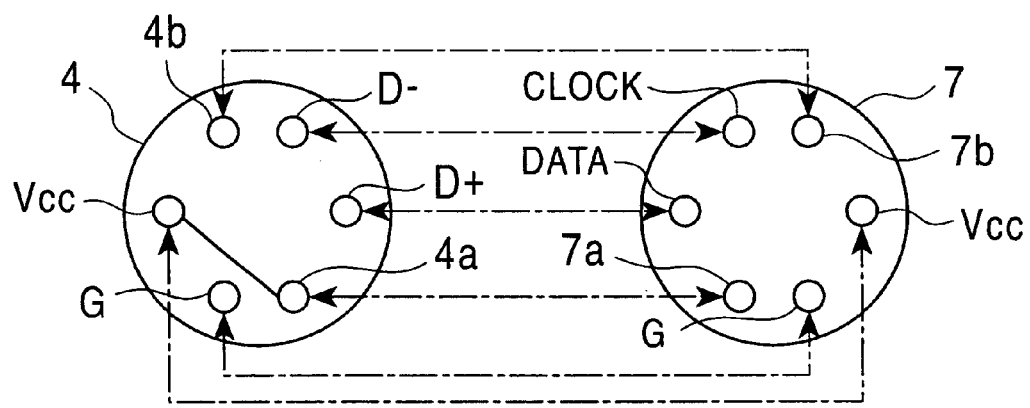
FIG. 2 is a sectional view showing a connector of a terminal and a connector of an adapter when an unused line is connected to a power supply.
Figure 3:
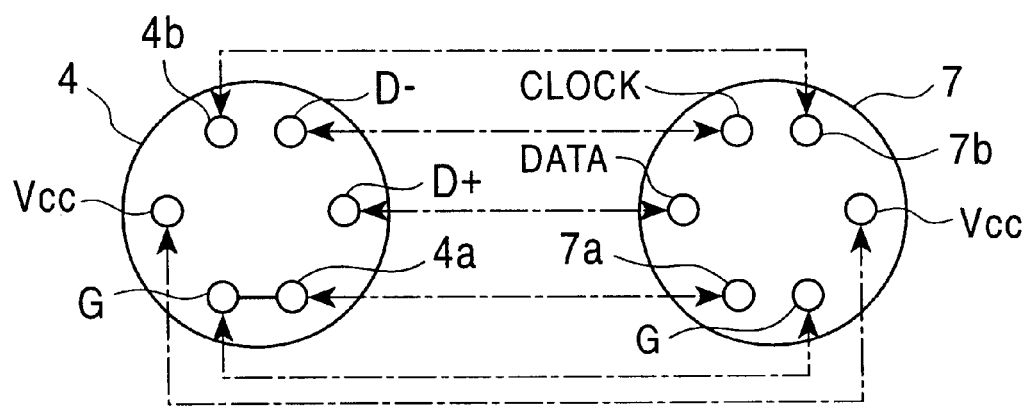
FIG. 3 is a sectional view showing a connector of a terminal and a connector of an adapter when an unused line is connected to the ground.

With reference to FIGS. 1 to 3, the present invention is described below. The following embodiment describes an interface switching device 1 according to an embodiment of the present invention, which switches between a PS/2 interface (first interface) and a USB interface (second interface), in which the PS/2 interface is provided at a terminal, the USB interface is provided at a host, and an adapter component is used to switch between the interface for the terminal and the interface for the host.

FIG. 1 shows how the interface switching device 1 is connected to both a computer 3 as the host and a keyboard unit 2 as the terminal. FIG. 2 shows the connector of the interface switching device 1 and the connector of the terminal when an unused line is connected to a power supply. FIG. 3 shows the connector of the interface switching device 1 and the connector of the terminal when the unused line is connected to the ground.

The interface switching device 1 is used to connect, for example, the keyboard unit 2 as the terminal and the computer 3 as the host.

The interface switching device 1 is formed by connecting, using a cable 6, a first female connector 4 adapted for the PS/2 interface, which can be connected to the keyboard unit 2, and a second connector 5 adapted for the USB interface.

In the keyboard unit 2, a keyboard 8 and a third male connector.(output unit) 7 adapted for the PS/2 interface are connected by a cable 11. The third male connector 7 can be connected to the first female connector 4. The keyboard 8 includes a first signal output unit 9 which can output a signal adapted for the PS/2 interface (a first interface) and a second output unit 10 which can output a signal adapted for the USB interface (a second interface), and a switching unit 13 which selects and connects either the first signal output unit 9 or the second signal output unit 10 to the third male connector 7. The keyboard 8 also includes a control unit 14 which controls the switching unit 13 by referring to an identification signal supplied to the cable 11.

The computer 3 is provided with a USB port (an input unit) 12 adapted for the USB interface, which can be connected to the second connector 5. Also a PS/2 port (not shown) adapted for the PS/2 interface is provided.

When the keyboard unit 2 is used, using the PS/2 interface, the third male connector 7 may be directly inserted into the PS/2 port of the computer 3 without using the interface switching device 1.

In the keyboard unit 2, it is assumed that the PS/2 interface is normally used. The third male connector 7 and the first signal output unit 9 are connected by the switching unit 13. While the third male connector 7 is being inserted into the PS/2 interface of the computer 3, the first signal output unit 9 in the keyboard 8 outputs a signal which is adapted for the PS/2 interface specifications and which is assigned to each key, in accordance with a key operation.

FIG. 2 shows data lines of the third male connector 7. The data lines consist of a power-supply line ($V_{CC}$), a ground line (G), a data line (DATA), a clock line (CLOCK), an identification line 7a, and an unused line 7b. When the third male connector 7 is directly connected to the PS/2 port of the computer 3, digital signals, composed of a high signal (5-volt signal) and a low signal (0-volt signal), are serially sent though the data line (DATA) in synchronization with a clock signal on the clock line (CLOCK).

When the keyboard unit 2 is used using the USB interface, the interface switching device 1 is used. The third male connector 7 of the keyboard unit 8 is connected to the first female connector 4, and the second connector 5 is inserted into the USB port 12 of the computer 3.

In the USB interface, a pair of signal lines is used to perform transmission and reception, and a signal in which a positive potential and a negative potential are alternately inverted is supplied to two signal lines, a "D+ line" and a "D− line".

As shown in FIG. 2, the first female connector 4 consists of six output lines, similarly to the third male connector 7. The first female connector 4 includes a power-supply line ($V_{CC}$), a ground line (G), the "D+ line", and the "D− line". The first female connector 4 also includes dummy lines 4a and 4b so as to be adapted for the third male connector 7 in accordance with the PS/2 interface specifications.

The power-supply line ($V_{CC}$), the ground line (G), the D+ line, the D− line, and the dummy lines (unused lines) 4a and 4b of the first female connector 4 are connected to the power-supply line ($V_{CC}$), the ground line (G), the data line (DATA), the clock line (CLOCK), the identification line 7a, and the unused line 7b of the third male connector 7, respectively.

In the first female connector 4, the dummy line 4a and the power-supply line ($V_{CC}$) are short-circuited, as shown in FIG. 2. Thus, when the third male connector 7 is connected to the first female connector 4, the identification line 7a of the third male connector 7 and the power-supply line ($V_{CC}$) are short-circuited by the dummy line 4a. This notifies, via the identification line 7a, the keyboard 8 of a power-supply voltage fixed at, e.g., 3.6 volts as identification information.

In the keyboard unit 8, the power-supply voltage (identification signal) is supplied to the control unit 14, and the control unit 14 confirms that the interface switching device 1 is being used, and controls the switching unit 13. The switching unit 13 controls the third male connector 7 to switch to be connected to the second signal output unit 10. The second signal output unit 10 outputs a signal in accordance with the USB interface specifications. At this time, among the lines of the third male connector 7 in accordance with the PS/2 interface specifications, the data line (DATA) and the clock line (CLOCK) are used as the D+ and D− lines in accordance with the USB specifications, and the second signal output unit 10 supplies the data line (DATA) and the clock line (CLOCK) with a signal in which a positive potential and a negative potential are alternately inverted. This signal is supplied to both the D+ line and the D− line of the first female connector 4. A signal adapted for the USB interface specifications is supplied from the second connector 5 to the USB port 12 of the computer 3.

When the interface switching device 1 is connected to the USB port 12 of the computer 3, a pull-up resistor (not shown) provided in the keyboard unit 2 beforehand operates. After that, polling from the computer 3 to the keyboard unit 2 is initiated. In response to the polling, the keyboard unit 2 notifies the computer 3 of a predetermined signal generated by a key operation.

When the interface switching device 1 is connected to the computer 3 and the keyboard unit 2, the power-supply voltage is applied to the data line (DATA) in the computer 3, and the applied voltage may be supplied as an identification signal to the keyboard 8.

Next, in the embodiment shown in FIG. 3, in the first connector 4, the dummy line 4a and the ground line (G) are, short-circuited. This notifies, via the identification line 7a, the keyboard 8 of the voltage fixed at zero volts, as identification information.

When receiving the identification information, the keyboard 8 is switched so that the second signal output unit 10 outputs a signal based on a format adapted for the USB interface, instead of outputting, by the first signal output unit 9, a signal having a format adapted for the PS/2 interface.

The present invention is not limited to switching between the PS/2 interface and the USB interface, but may be applied to switching between different types of interfaces, for example, to switching with a type of interface having a data-transfer speed higher that of the PS/2 interface or the USB interface.

Also, by short-circuiting the dummy lines 4a and 4b, and providing a power supply such as a primary battery or a secondary battery in the keyboard unit 2, a predetermined signal may be periodically sent to the lines 7a (or 7b). In this structure, when the interface switching device 1 is connected, the two lines 7a and 7b are short-circuited by the connected interface switching device 1. As a result, the predetermined signal is supplied to the keyboard 8 from the line 7a to the line 7b (or the opposite direction), whereby the PS/2 interface is switched to the USB interface.

What is claimed is:

1. An interface switching device, comprising:

an output unit adapted for a first interface having multiple lines, the output unit provided on a side of a terminal;

an input unit adapted for a second interface having multiple lines, the input unit provided on the side of a host; and an adapter for connecting the output unit on the terminal side and the input unit on the host side;

wherein, when the output unit on the terminal side is connected to said adapter, said adapter supplies identification information to the output unit on the terminal side, and the output unit on the terminal side is switched to a signal adapted for the second interface, and wherein said identification information is supplied to the output unit on the terminal side by at least one of the lines of the first interface that is not used by the second interface.

2. An interface switching device according to claim 1, wherein the unused line is connected to a power-supply line or a ground line.

3. An interface switching device according to claim 1, wherein said first interface is a PS/2 interface.

4. An interface switching device according to claim 1, wherein said second interface is a USB interface.

5. An interface switching device as in claim 1, wherein said terminal has a switching unit.

* * * * *